United States Patent
Ji et al.

(10) Patent No.: US 9,602,145 B2
(45) Date of Patent: Mar. 21, 2017

(54) INSERTION LOSS IMPROVEMENT IN A MULTI-BAND DEVICE

(75) Inventors: Tingfang Ji, San Diego, CA (US);
Heechoon Lee, San Diego, CA (US);
Valentin A. Gheorghiu, Tokyo (JP)

(73) Assignee: QUALCOMM INCORPORATED, San Diego, CA (US)

( * ) Notice: Subject to any disclaimer, the term of this patent is extended or adjusted under 35 U.S.C. 154(b) by 867 days.

(21) Appl. No.: 13/367,321

(22) Filed: Feb. 6, 2012

(65) Prior Publication Data

US 2013/0039227 A1 Feb. 14, 2013

Related U.S. Application Data

(60) Provisional application No. 61/440,333, filed on Feb. 7, 2011.

(51) Int. Cl.
*H04B 1/00* (2006.01)

(52) U.S. Cl.
CPC ........... *H04B 1/0057* (2013.01); *H04B 1/006* (2013.01)

(58) Field of Classification Search
CPC ...... H04L 1/188; H04W 28/18; H04W 24/00; H04W 28/04; H04B 1/006; H04B 1/0057
USPC .................................. 370/277, 279
See application file for complete search history.

(56) References Cited

U.S. PATENT DOCUMENTS

| | | | |
|---|---|---|---|
| 6,567,653 B1* | 5/2003 | Sanders ........................ | 455/126 |
| 7,711,070 B2 | 5/2010 | Weissman et al. | |
| 2005/0215204 A1 | 9/2005 | Wallace et al. | |
| 2007/0155344 A1 | 7/2007 | Wiessner et al. | |
| 2007/0268845 A1* | 11/2007 | Martinez ................ | G01S 19/35 370/278 |
| 2009/0207764 A1 | 8/2009 | Fukamachi et al. | |
| 2009/0285135 A1* | 11/2009 | Rousu et al. ................. | 370/297 |
| 2011/0111708 A1 | 5/2011 | Tu et al. | |

FOREIGN PATENT DOCUMENTS

| | | |
|---|---|---|
| CN | 2800677 Y | 7/2006 |
| GB | 2430838 A | 4/2007 |

OTHER PUBLICATIONS

International Search Report and Written Opinion—PCT/US2012/024168—ISA/EPO—Apr. 24, 2012.
"GP-070117 MS Receiver Intermodulation Analysis for Hybrid Type 2 Architecture". 3GPP TSG FERAN#33: Research in Motion [Online] 2007, pp. 1-12. See pp. 1-3.

* cited by examiner

*Primary Examiner* — Kan Yuen
*Assistant Examiner* — Richard Chang
(74) *Attorney, Agent, or Firm* — Seyfarth Shaw LLP

(57) ABSTRACT

A multi-band user equipment (UE) is configured to operate in a single frequency band mode or a multiple frequency band mode. When operating in a single frequency band mode, the UE activates a bypass switch to route uplink signals of a first band around a multiplexer and reduce the insertion loss for the band.

14 Claims, 16 Drawing Sheets

INSERTION LOSS IMPROVEMENT IN A MULTI-BAND DEVICE

CROSS-REFERENCE TO RELATED APPLICATION

This application claims the benefit under 35 U.S.C. §119(e) to U.S. Provisional Patent Application No. 61/440,333 entitled "UL INSERTION LOSS IMPROVEMENT IN A MULTI-BAND DEVICE," filed on Feb. 7, 2011, the disclosure of which is expressly incorporated by reference herein in its entirety.

BACKGROUND

Field

Aspects of the present disclosure relate generally to wireless communication systems, and more particularly to the simultaneous operation of a user equipment in multiple frequency bands.

Background

Wireless communication networks are widely deployed to provide various communication services such as voice, video, packet data, messaging, broadcast, etc. These wireless networks may be multiple-access networks capable of supporting multiple users by sharing the available network resources. A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

SUMMARY

According to one aspect of the present disclosure, a method of wireless communication in a multiple frequency band user equipment is described. The user equipment is configured to operate in a single frequency band mode and a multiple frequency band mode. The method includes operating the multiple frequency band user equipment in a single frequency band mode with a first band. Uplink and downlink signals of the first band are passed through a duplexer. A multiplexer is bypassed while routing uplink signals of the first band for transmission.

Another aspect discloses an apparatus for wireless communication in a multiple frequency band user equipment configured to operate in a single frequency band mode and a multiple frequency band mode. The apparatus includes a memory and at least one processor coupled to the memory. The processor(s) is configured to operate the multiple frequency band user equipment in a single frequency band mode with a first band. The processor(s) is also configured to pass uplink and downlink signals of the first band through a duplexer. The processor(s) bypasses a multiplexer while routing uplink signals of the first band for transmission.

In another aspect, an apparatus for wireless communication is disclosed. The apparatus is a multiple frequency band user equipment configured to operate in a single frequency band mode and a multiple frequency band mode. The apparatus includes means for operating the multiple frequency band user equipment in a single frequency band mode with a first band. The apparatus further includes means for passing uplink and downlink signals of the first band through a duplexer. The apparatus also includes means for bypassing a multiplexer while routing uplink signals of the first band for transmission.

Another aspect discloses a computer program product for wireless communication in a wireless network having a non-transitory computer-readable medium. The computer program product has non-transitory program code recorded thereon which, when executed by the processor(s), causes the processor(s) to perform operations of operating a multiple frequency band user equipment in a single frequency band mode with a first band. The program code also causes the processor(s) to pass uplink signals and downlink signals of the first band through a duplexer. Additionally, the program code causes the processor to bypass a multiplexer while routing uplink signals of the first band for transmission.

In another aspect, an apparatus capable of operating in a single carrier mode and in a multicarrier mode is described. The apparatus includes a first signal path for a signal of a first frequency band. The apparatus further includes a second signal path for a signal of a second frequency band. In addition, the apparatus includes a diplexer operable to multiplex the first and second signal paths. The apparatus also includes, an antenna switch coupled to the diplexer. The apparatus additionally includes a bypass switch coupled to the diplexer, the antenna switch, and the first signal path. This bypass switch is operable to couple the first signal path to the antenna switch when in single carrier mode, and operable to couple the first signal path to the diplexer when in multicarrier mode.

In another aspect, an apparatus capable of operating in a single carrier mode and in a multicarrier mode is described. The apparatus includes a first UL signal path for a signal of a first frequency band and a second UL signal path for a signal of a second frequency band. The apparatus further includes a composite DL signal path including a first DL signal path of the first frequency band and a second DL signal path of the second frequency band. In addition, the apparatus includes a first duplexer coupled to a the first UL signal path and the first DL signal path, and operable to multiplex the first UL signal path and the first DL signal path. The apparatus also includes a second duplexer coupled to a the second UL signal path and the second DL signal path, and operable to multiplex the second UL signal path and the second DL signal path. The apparatus further includes an antenna switch coupled to the first and second duplexers. The apparatus additionally includes a bypass switch coupled to the first and second duplexers, and the composite DL signal path. This bypass switch is operable to couple the composite DL signal path to the first duplexer when in single carrier mode, and is operable to couple the composite DL signal path to the second duplexer when in multicarrier mode.

According to another aspect, an apparatus capable of operating in a single carrier mode and in a multicarrier mode is described. The apparatus includes a first UL signal path for a signal of a first frequency band and a second UL signal path for a signal of a second frequency band. The apparatus further includes a first DL signal path of the first frequency band and a second DL signal path of the second frequency band. In addition, the apparatus includes a duplexer coupled to a the first UL signal path and the first DL signal path, and being operable to multiplex the first UL signal path and the first DL signal path. The apparatus also includes a triplexer coupled to and operable to multiplex the first DL signal path, the second UL signal path and the second DL signal path. Additionally, the apparatus includes an antenna switch coupled to the duplexer and the triplexer. The apparatus further includes a bypass switch coupled to the duplexer and the triplexer, and the first DL signal path. This bypass switch is operable to couple the first DL signal path to the first duplexer when in single carrier mode, and operable to couple the first DL signal path to the triplexer when in multicarrier mode.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
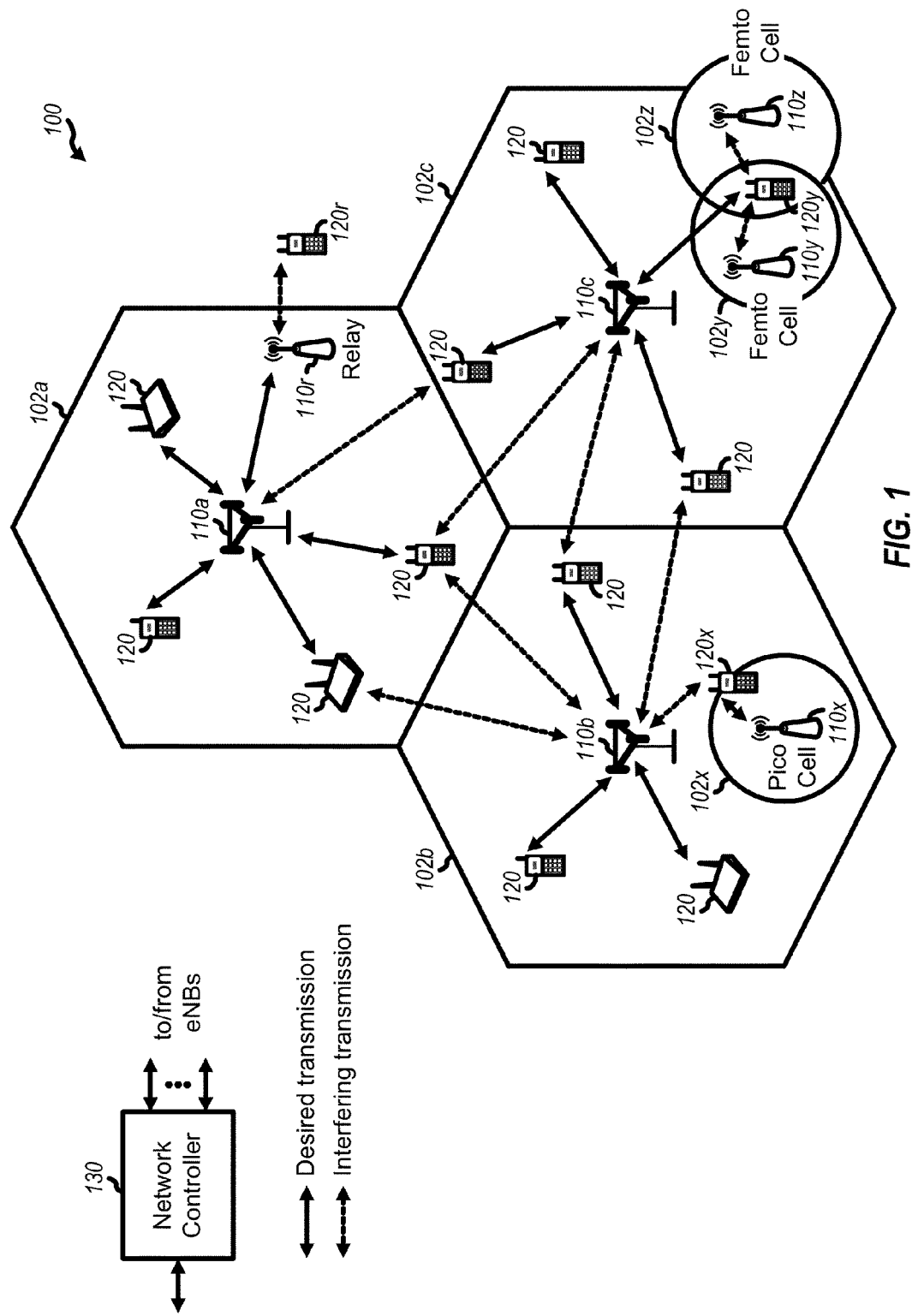
FIG. 1 is a block diagram conceptually illustrating an example of a telecommunications system.

FIG. 1 shows a wireless communication network 100, which may be an LTE-A network configured to reduce signal path insertion loss. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 (e.g., UE 120x, UE 120y, etc.) are dispersed throughout the wireless network 100, and each UE may be stationary or mobile. A UE may also be referred to as a terminal, a user terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a netbook, a smart book, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth.

Figure 2:
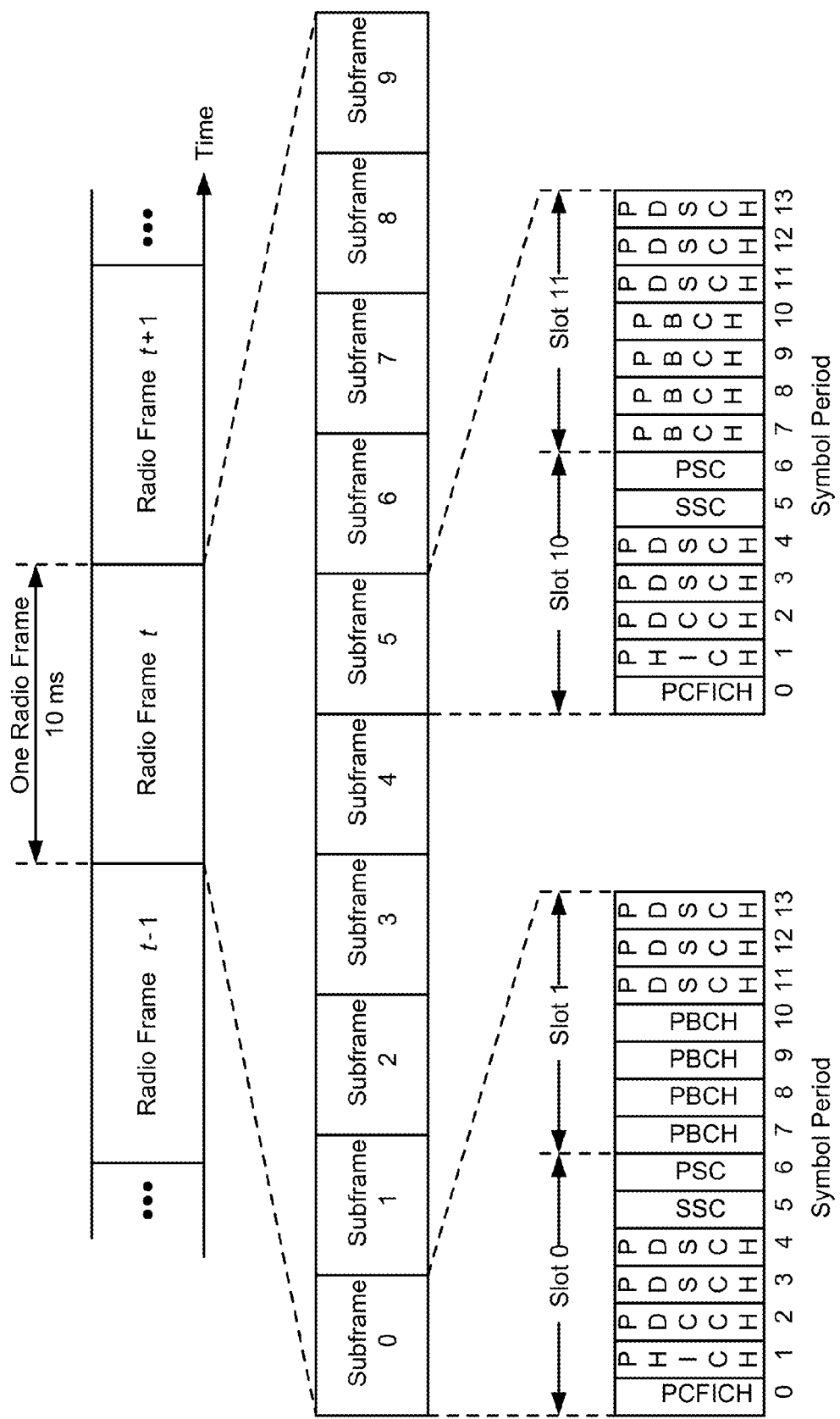
FIG. 2 is a block diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic repeat request (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
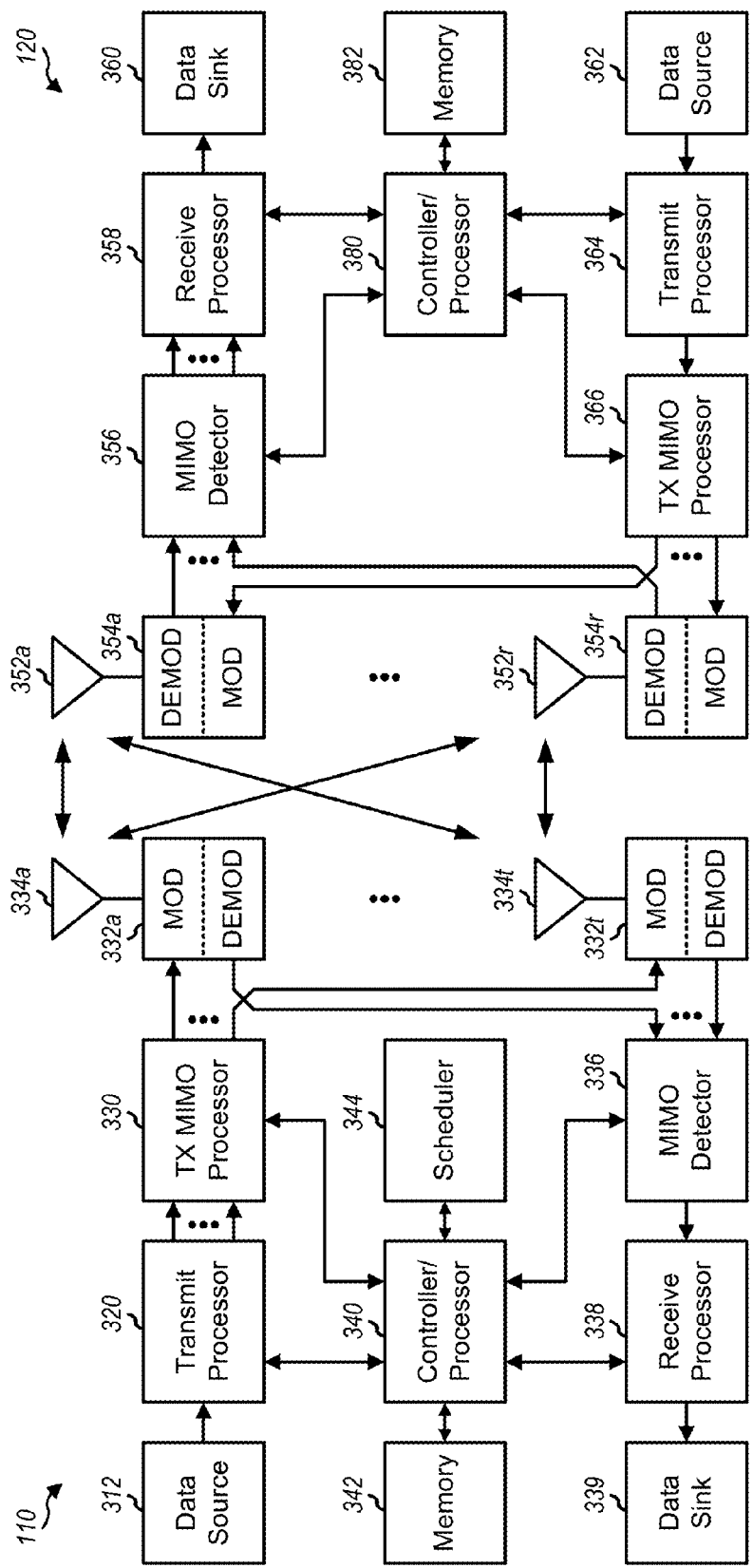
FIG. 3 is a block diagram conceptually illustrating a design of a base station/eNodeB and a UE configured according to one aspect of the present disclosure.

FIG. 3 shows a block diagram of a design of a base station/eNodeB 110 and a UE 120, which may be one of the base stations/eNodeBs and one of the UEs in FIG. 1. For example, the base station 110 may be the macro eNodeB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340. The base station 110 can send messages to other base stations, for example, over an X2 interface (not shown).

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 9 and 11, and/or other processes for the techniques described herein. The memories 342 and 382 may store data and program codes for the base station 110 and the UE 120, respectively. A scheduler 344 may schedule UEs for data transmission on the downlink and/or uplink.

Carrier Aggregation

LTE-Advanced UEs use spectrum in up to 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 MHz. These asymmetric FDD assignments will conserve spectrum and are a good fit for the typically asymmetric bandwidth utilization by broadband subscribers.

Carrier Aggregation Types

Figure 4A:
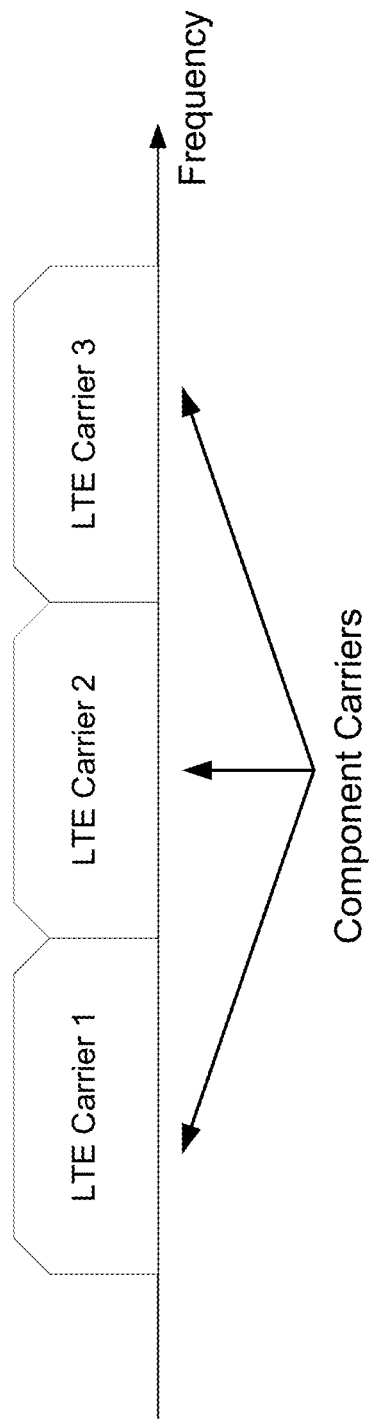
FIG. 4A discloses a continuous carrier aggregation type.
Figure 4B:
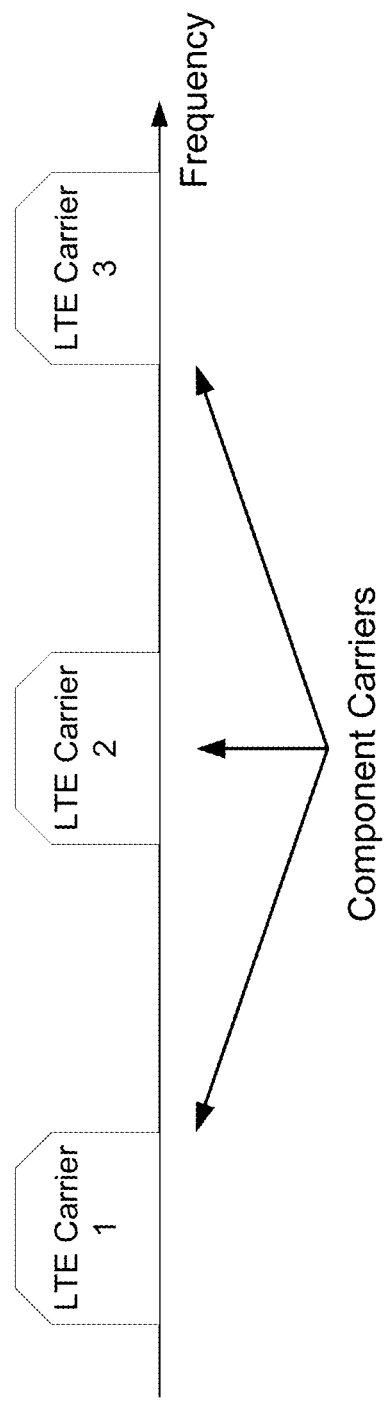
FIG. 4B discloses a non-continuous carrier aggregation type.

For the LTE-Advanced mobile systems, two types of carrier aggregation (CA) methods have been proposed, continuous CA and non-continuous CA. They are illustrated in FIGS. 4A and 4B. Non-continuous CA occurs when multiple available component carriers are separated along the frequency band (FIG. 4B). On the other hand, continuous CA occurs when multiple available component carriers are adjacent to each other (FIG. 4A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Data Aggregation Schemes

Figure 5:
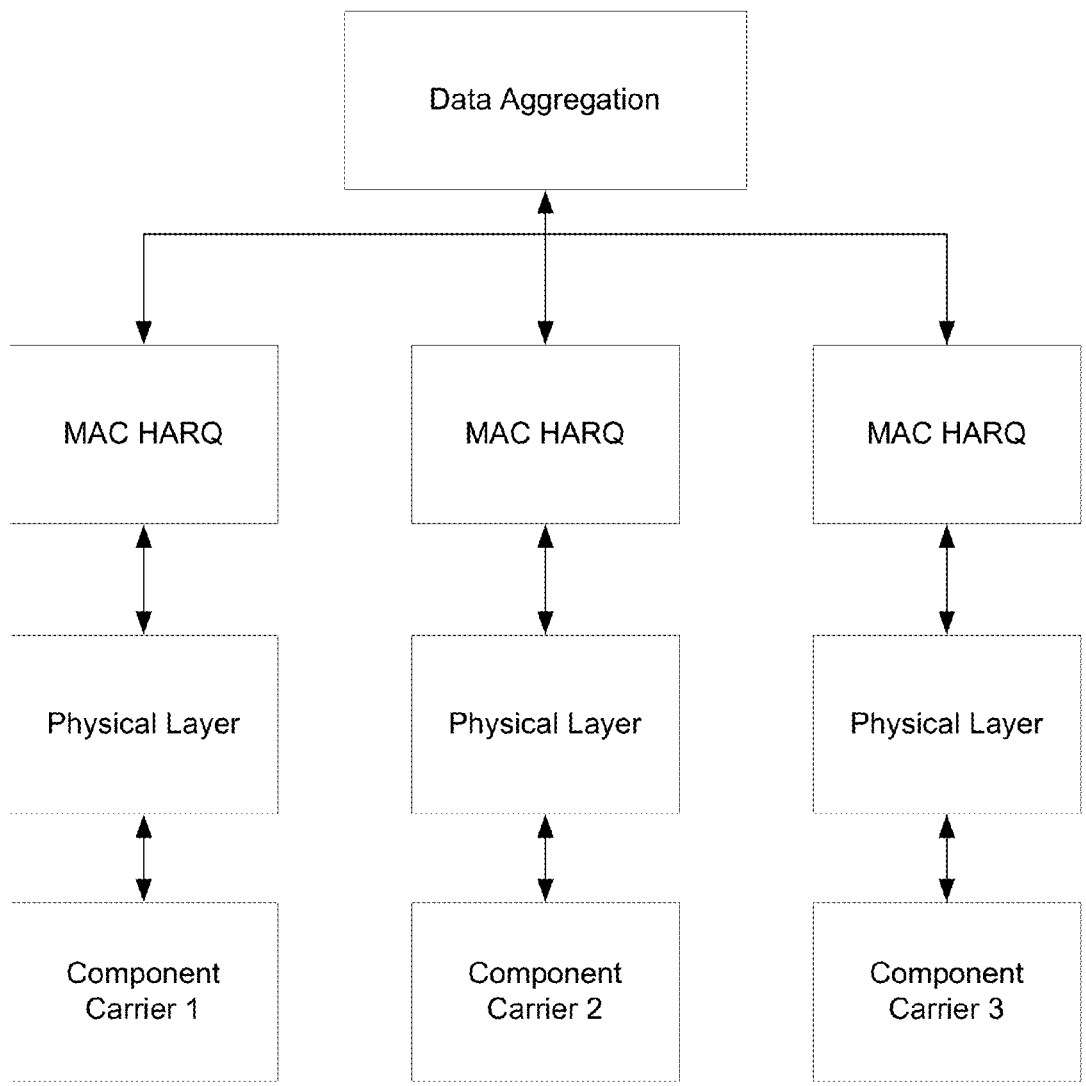
FIG. 5 discloses MAC layer data aggregation.

FIG. 5 illustrates aggregating transmission blocks (TBs) from different component carriers at the medium access control (MAC) layer (FIG. 5) for an IMT-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configurations) in the physical layer. Similarly, in the physical layer, one HARQ entity is provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various examples, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNodeB.

In some examples, there may be multiple primary carriers. In addition, secondary carriers may be added or removed without affecting the basic operation of the UE, including physical channel establishment and RLF procedures which are layer 2 and layer 3 procedures, such as in the 3GPP technical specification 36.331 for the LTE RRC protocol.

Figure 6:
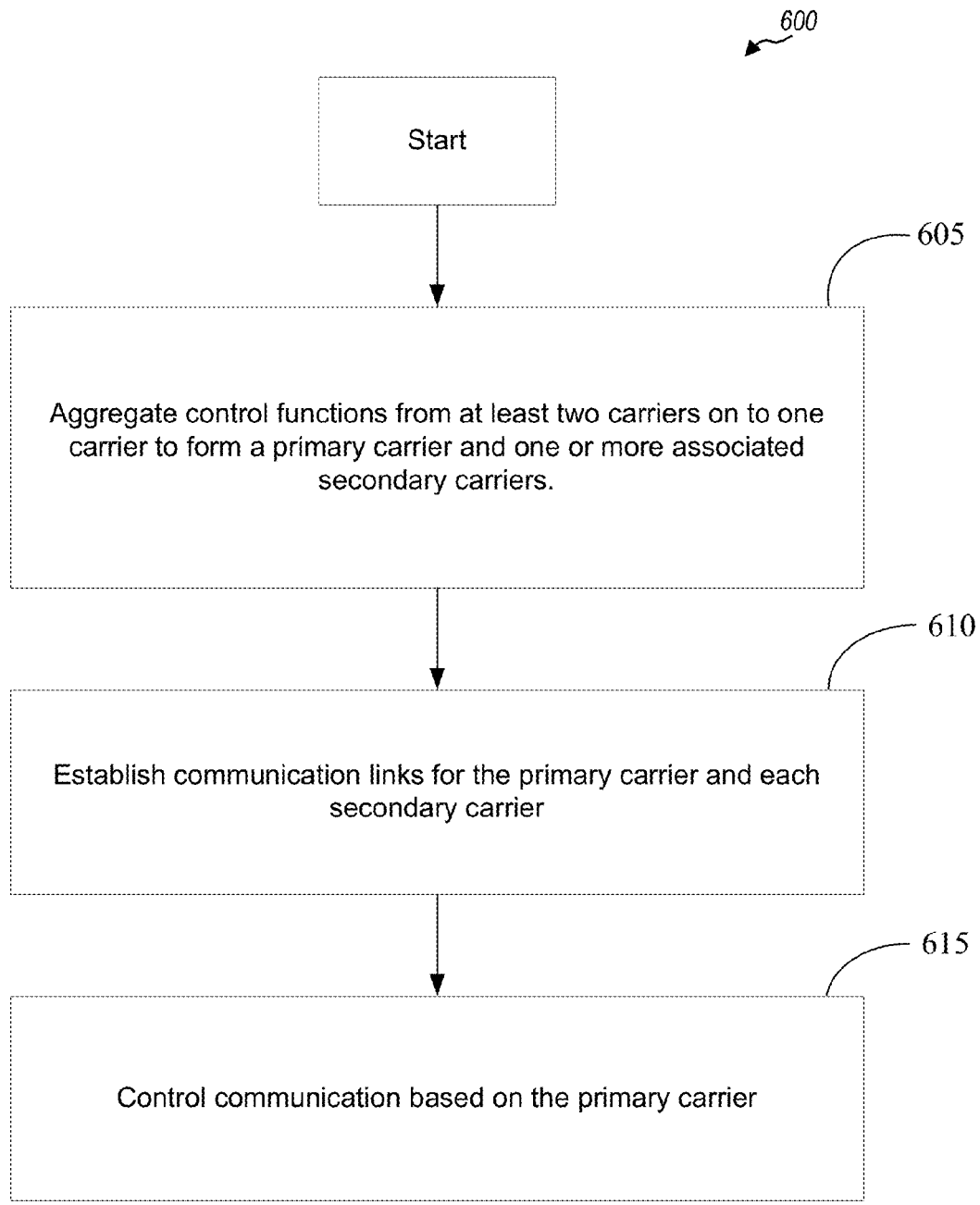
FIG. 6 is a block diagram illustrating a method for controlling radio links in multiple carrier configurations.

FIG. 6 illustrates a method 600 for controlling radio links in a multiple carrier wireless communication system by grouping physical channels according to one example. As shown, the method includes, at block 605, aggregating control functions from at least two carriers onto one carrier to form a primary carrier and one or more associated secondary carriers. Next at block, 610, communication links are established for the primary carrier and each secondary carrier. Then, communication is controlled based on the primary carrier in block 615.

In some designs, a multi-band user equipment may have multiple power amplifiers outputting signals for transmission in the uplink direction. For example, in the U.S., the wireless cellular devices may use frequency bands 12 and 13 for simultaneous wireless communication.

Briefly and in general terms, inserting a bypass switch to route uplink signals around a multiplexer (e.g., diplexer, triplexer, quadplexer, etc.) for a particular band (e.g., Band A in the examples below), may reduce the insertion loss for that particular band while the wireless device is operating in a specific band mode (e.g., a single band mode). Such a reduction in the insertion loss value may be accomplished, for example, by taking out a frequency isolation stage from the signal path and using a bypass switch instead. In typical implementations, the insertion loss of a switch may be several tens of decibels (dB) less than that of a frequency isolation stage such as a diplexer, a triplexer or a quadplexer. In one aspect, the provision of a bypass switch and the ability to configure the operation of the bypass switch may improve a cellular operator's coverage in the particular band.

Figure 7:
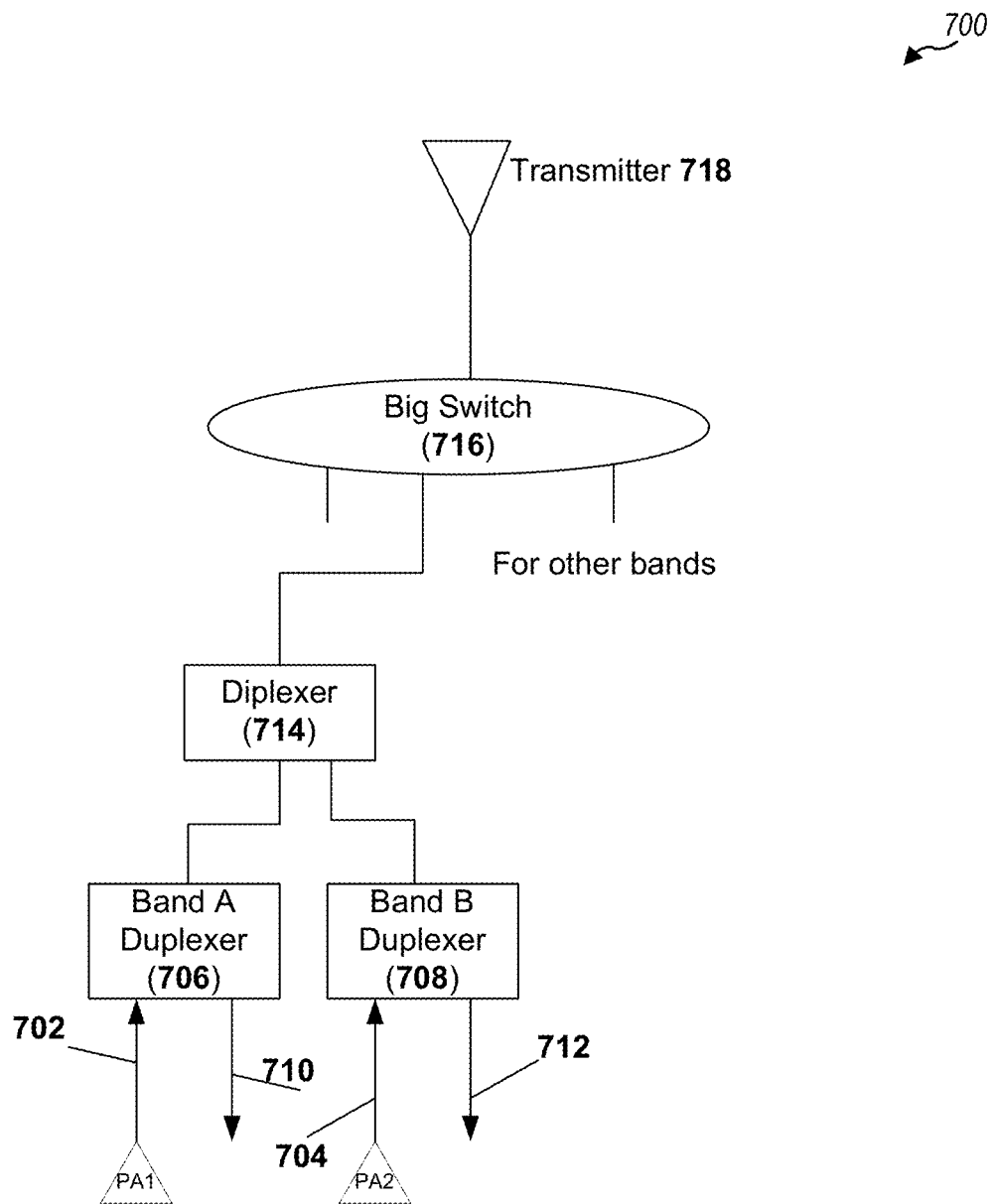
FIG. 7 is a block diagram representation of a dual band user equipment radio frequency front end with a diplexer.

FIG. 7 is a block diagram representation of a dual band UE radio frequency (RF) front end 700. In the uplink direction, the signal outputs 702, 704 of power amplifiers PA1 (band A) and PA2 (band B) are passed through duplexers 706, 708 to achieve uplink/downlink signal separation with downlink signals 710, 712 in each band. The uplink signals 702, 704 are further passed through a diplexer 714 for frequency band separation and provided to a multi-port "big switch" 716 to one or more transmit antennas 718. In a typical user equipment, the signal output of power amplifier 1 (PA1) may experience around 2 to 3.5 dB insertion loss in the duplexer 706 and an additional 0.5 to 1 dB loss through the diplexer 714.

Figure 8:
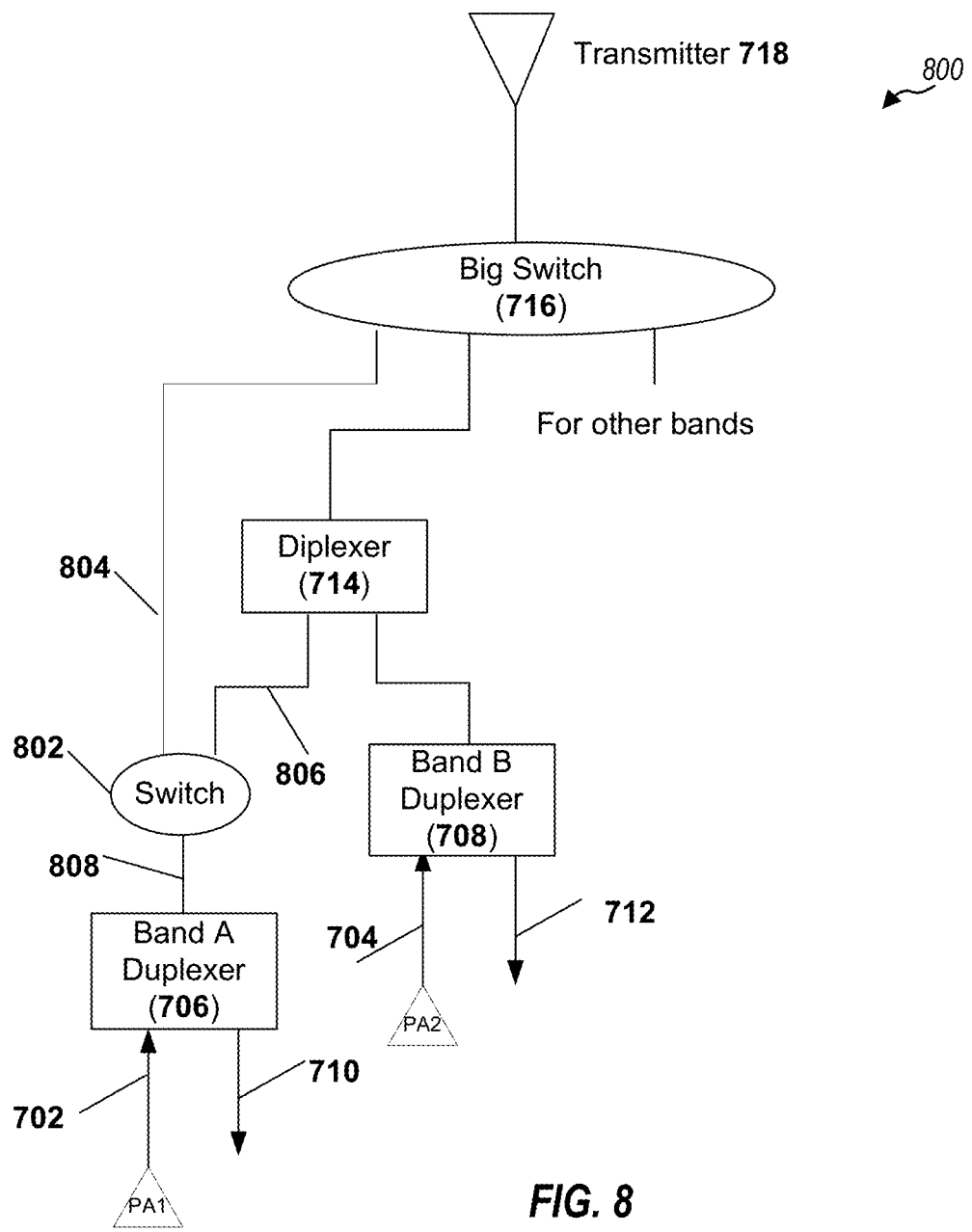
FIG. 8 is a block diagram representation of a dual band user equipment radio frequency front end with a bypass switch.

FIG. 8 is a block diagram representation of a dual band UE RF front end 800, where a bypass switch 802 is provided for bypass operation. The bypass switch 802 may be configured to operate as follows. When the UE is operating in a single band mode, for example, in Band A, the bypass switch 802 may be configured to route the uplink signal 808, received from the duplexer 706, on signal path 804 for transmission. In some designs, the signal path 804 may be coupled to a multi-port switch 716, which is in turn coupled to the transmit antennas 718. On the other hand, when the UE operates in a dual (or multi-) band mode, the bypass switch 802 may be configured to output the uplink signal 808 on the signal path 806 to the diplexer 714. The diplexer 714 may be configured to operate in the frequency band A and at least one other frequency band (e.g., frequency band B) and provide isolation to the corresponding uplink and downlink signals in the frequency bands.

It will be appreciated that, in one aspect, the configuration described with respect to FIG. 8 may reduce the total insertion loss experienced by the uplink signal 702 during the single band operation. For example, during the single band operation, in addition to the insertion loss (IL) through the duplexer 706 the uplink signal 702 may experience an additional insertion loss of approximately 0.3 dB through a typical design of the switch 802. When compared with the configuration depicted in FIG. 7, it will be appreciated that the bypass switch 802 allows bypassing of the uplink signal 702, and by avoiding insertion loss through the diplexer 714, which may typically have about 0.5 to 1 dB insertion loss (IL), it will be appreciated that the use of the bypass switch 802 may result in insertion loss that is approximately 0.2 to 0.7 dB less during the single frequency band operation. It will be appreciated by one of skill in the art that the reduced insertion loss in the processing of uplink signals in a UE may, in one aspect, result in a wider signal coverage in a wireless cellular system.

Figure 9:
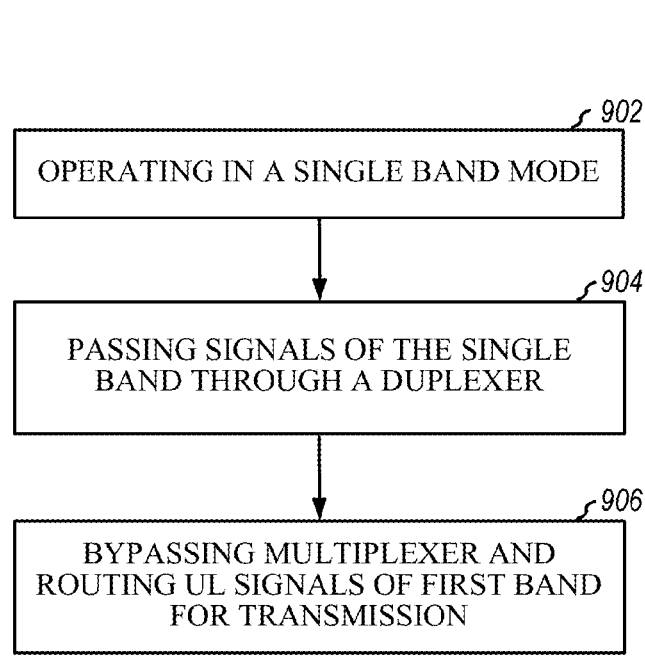
FIG. 9 is a flow chart representation of a method of wireless communication.

FIG. 9 is a flow chart representation of a method 900 of protecting an uplink signal in a frequency band of interest in a multi-band transmission device. At block 902, the UE operates in a single band mode. For example, the determination of a frequency band mode of operation of the UE 120 may be performed semi-statically (e.g., during network planning and deployment stage). In some designs, UEs 120 deployed in a cellular network may be configured for a single band or a multi-band operation (e.g., factory setting). In some designs, the determination of the frequency band mode of operation may be performed based on user input and/or network input (e.g., a higher layer configuration message from the eNB 110). In some designs, the determination may be performed simply by reading a corresponding control setting from a memory location or register. At block 904, the signals of the single band are passed through a duplexer. At block 906, the uplink signal of the single band is selectively processed through a bypass switch based on the frequency band mode. In some designs, the selective processing may for example be performed by controlling the operation of the bypass switch 802. As discussed, the bypass switch 802 may be configured to accept an input uplink signal (e.g., signal 808) and output the signal to either a first output 804 or a second output 806, as controlled by the corresponding frequency mode of operation.

In one configuration, the UE 120 is a multiple frequency band UE and includes a means for operating in a single frequency band mode with a first band. In one aspect, the operating means may be a controller/processor 380 configured to perform the functions recited by the operating means. The UE is also configured to include a means for passing uplink/downlink signals. In one aspect, the passing means may be a duplexer 706 configured to perform the functions recited by the passing means. The UE 120 also includes a means for bypassing a multiplexer. In one aspect, the bypassing means may be the switch 802 configured to perform the functions recited by the bypassing means.

Figure 10:
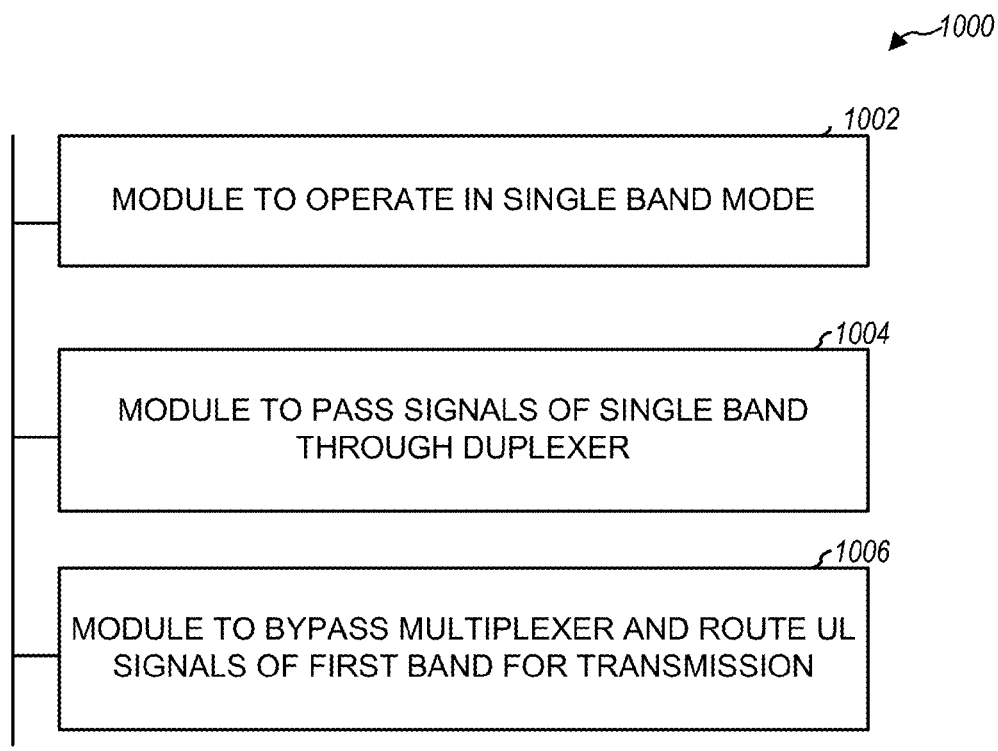
FIG. 10 is a block diagram representation of a portion of a wireless communication apparatus.

FIG. 10 is a block diagram representation of a portion of an apparatus 1000 for protecting an uplink signal in a frequency band of interest in a multi-band transmission device. The apparatus 1000 includes the module 1002 for operating in a particular single band mode after determining a frequency band mode. The module 1002 may include, for example, a register or a memory location for storing an operational mode value and a processor for reading the operational mode value. The apparatus 1000 includes the module 1004 for passing signals of the single band through a duplexer. The module 1002 may include, for example, a Band A duplexer 706, the operation of which has been previously discussed. The apparatus 100 includes the module 1006 for bypassing a multiplexer and routing uplink signals of the single band for transmission. The module 1006 may comprise, for example, the bypass switch 802, the operation of which has been previously discussed.

Figure 11:
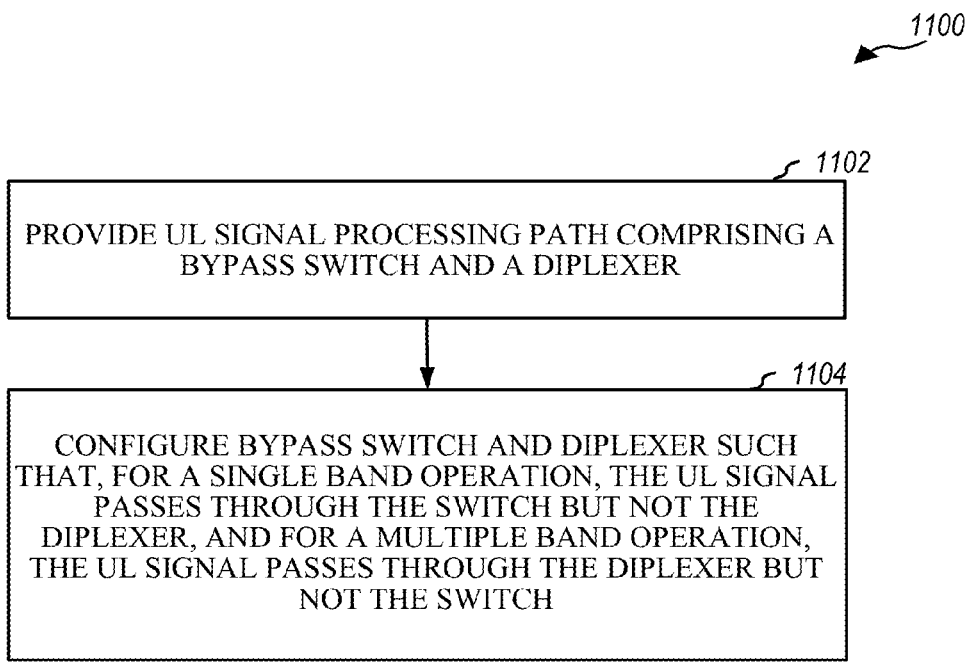
FIG. 11 is a flow chart representation of a method of wireless communication.

FIG. 11 is a flow chart representation of a method 1100 of operating a wireless device capable of simultaneous operation in multiple frequency bands. At block 1102, an uplink signal processing path including a bypass switch and a diplexer is provided. The uplink processing path may be, for example, as depicted in FIG. 8. At block 1104, the bypass switch and the diplexer are configured such that, for a single band operation, the uplink signal passes through the switch but not the diplexer, and for a multiple band operation, the uplink signal passes through the diplexer but not the switch. In some designs, the operations in block 1104 may be similar to the previously discussed operation in connection with the bypass switch 802.

Figure 12:
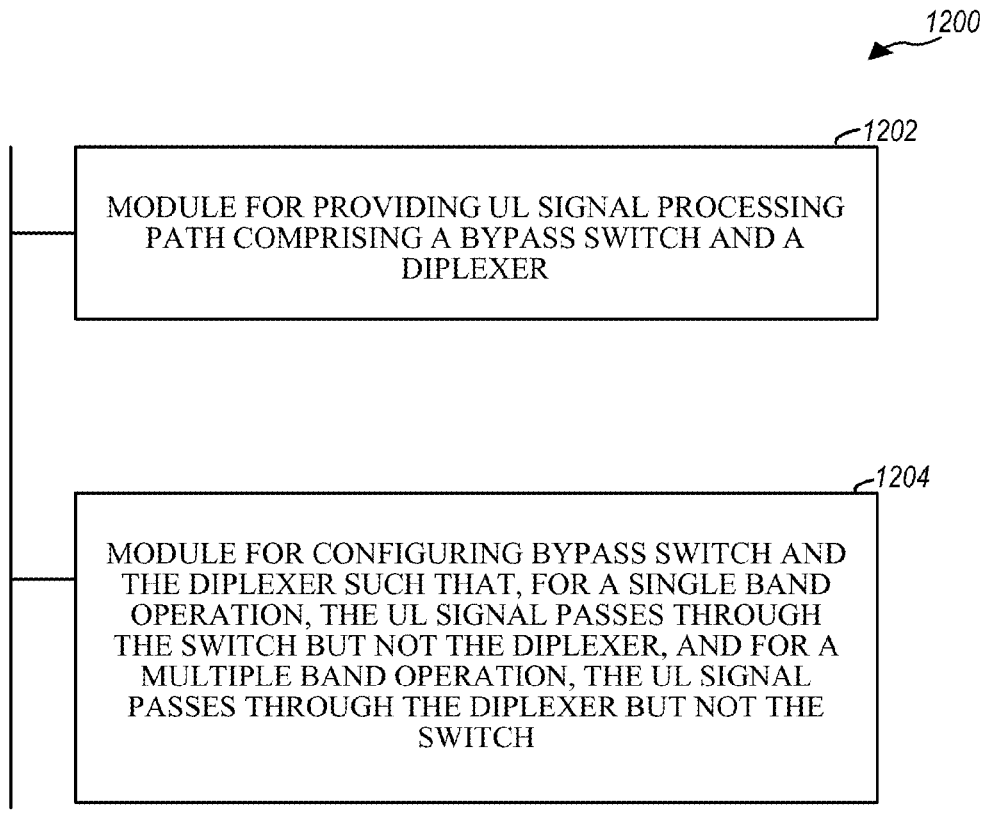
FIG. 12 is a block diagram representation of a portion of a wireless communication apparatus.

FIG. 12 is a block diagram representation of a portion of a wireless communication apparatus 1200 capable of simultaneous operation in multiple frequency bands. The module 1202 is for providing an uplink signal processing path comprising a bypass switch and a diplexer. The module 1204 is for configuring the bypass switch and the diplexer such that, for a single band operation, the uplink signal passes through the switch but not the diplexer, and for a multiple band operation, the uplink signal passes through the diplexer but not the switch.

In some designs, a UE 120 may be configured for simultaneous operation in multiple frequency bands. In some designs, a triplexer may be provided in the RF front end of the UE 120 for achieving frequency isolation of different uplink signals in different frequency bands, and a combined downlink signal for the different frequency bands of operation.

Figure 13:
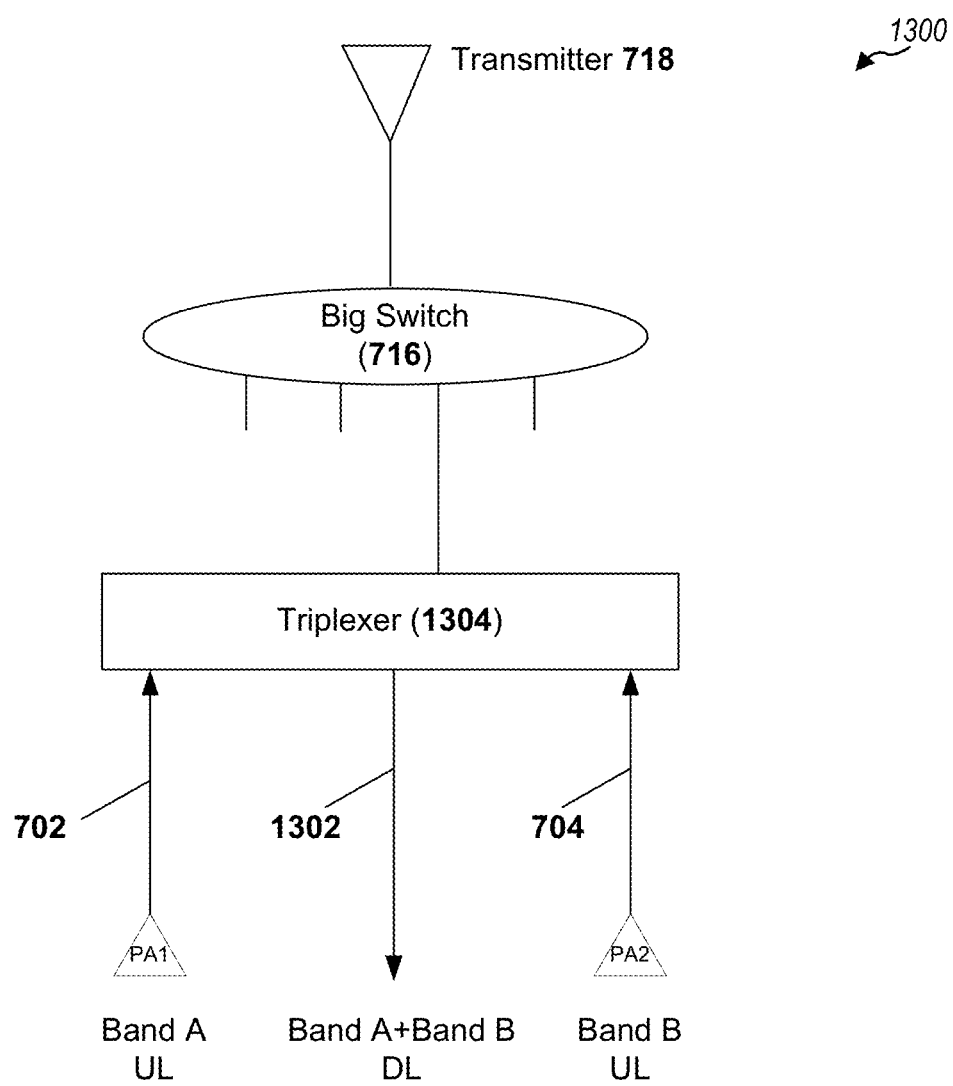
FIG. 13 is a block diagram representation of a dual band user equipment radio frequency front end with a triplexer.

FIG. 13 is a block diagram representation of a wireless communication device 1300 including a triplexer 1304 for supporting multi-band wireless communication. The triplexer 1304 provides frequency isolation for uplink signals 702, 704 for different frequency bands (e.g., frequency bands A and B), and a downlink signal 1302, which is a combined downlink signal for the frequency bands (e.g., combined downlink signal for frequency bands A and B). A typical triplexer 1304 may result in an insertion loss that is about 1 dB greater than the insertion loss of a typical duplexer, as described with respect to FIGS. 7 and 8. The triplexer 1304 may in turn be coupled to the multi-port switch 716 and the antennas 718. As an example, the device 1300 may be used in a wireless communication system having adjacent frequency bands A and B.

Figure 14:
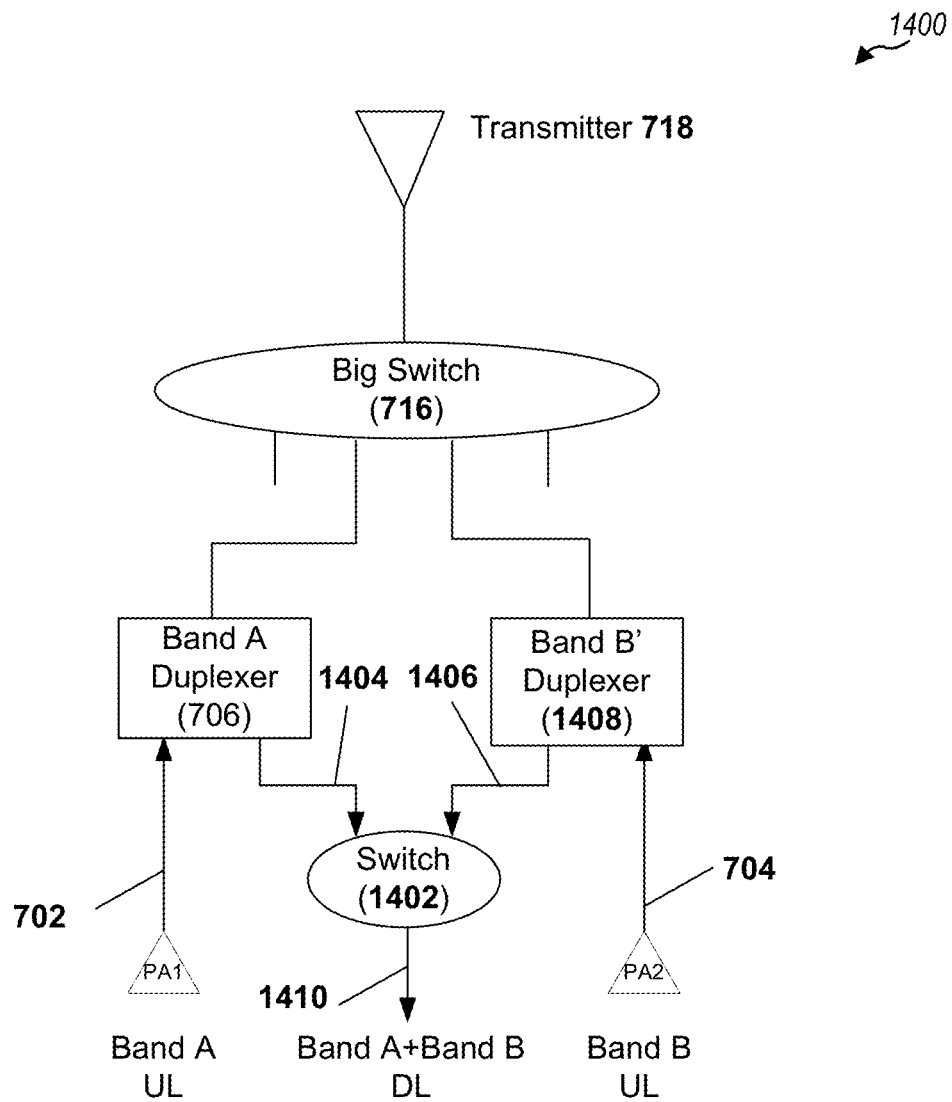
FIG. 14 is a block diagram representation of a dual band user equipment radio frequency front end with a duplexer and a bypass switch.

FIG. 14 is a block diagram representation of a wireless communication device 1400. Compared to the device 1300, the triplexer 1304 is replaced with the duplexers 706 and 1408 and a bypass switch 1402. The bypass switch 1402 may include at least two input ports. A first input port may be coupled to the output 1404 of the duplexer 706. A second input port may be coupled to the output 1406 of the duplexer 1408. The duplexer 1408 may be a modified Band B duplexer in the sense that the duplexer 1408 may be configured to provide isolation to the Band B uplink signal 704 and the combined Band A+Band B downlink signal 1406.

In some designs, when the device 1400 is operated in a single frequency band mode, the bypass switch 1402 may be operated to provide the output signal 1404 of the Band A duplexer 706 as the downlink signal 1410. The downlink signal 1410 may server as a combined downlink signal for the single frequency band, and other frequency bands supported by the device 1400. Therefore, in the single band operation mode, the downlink signal for Band A may experience insertion loss through the duplexer 706 and switch 1402, compared to the corresponding insertion loss through the triplexer 1304 for device 1300. Because a typical triplexer 1304 may have an insertion loss about 1 dB greater than that of a typical duplexer 706, assuming a 0.3 dB loss through the bypass switch 1402, the insertion loss experienced by the single-band downlink signal in the device 1400 may be about 0.7 dB less than that in the device 1300. It will be appreciated that such an improvement in the insertion loss in the front end radio frequency portion in the device 1400 may improve the range of wireless communication of a base station in a cellular wireless communication system.

Figure 15:
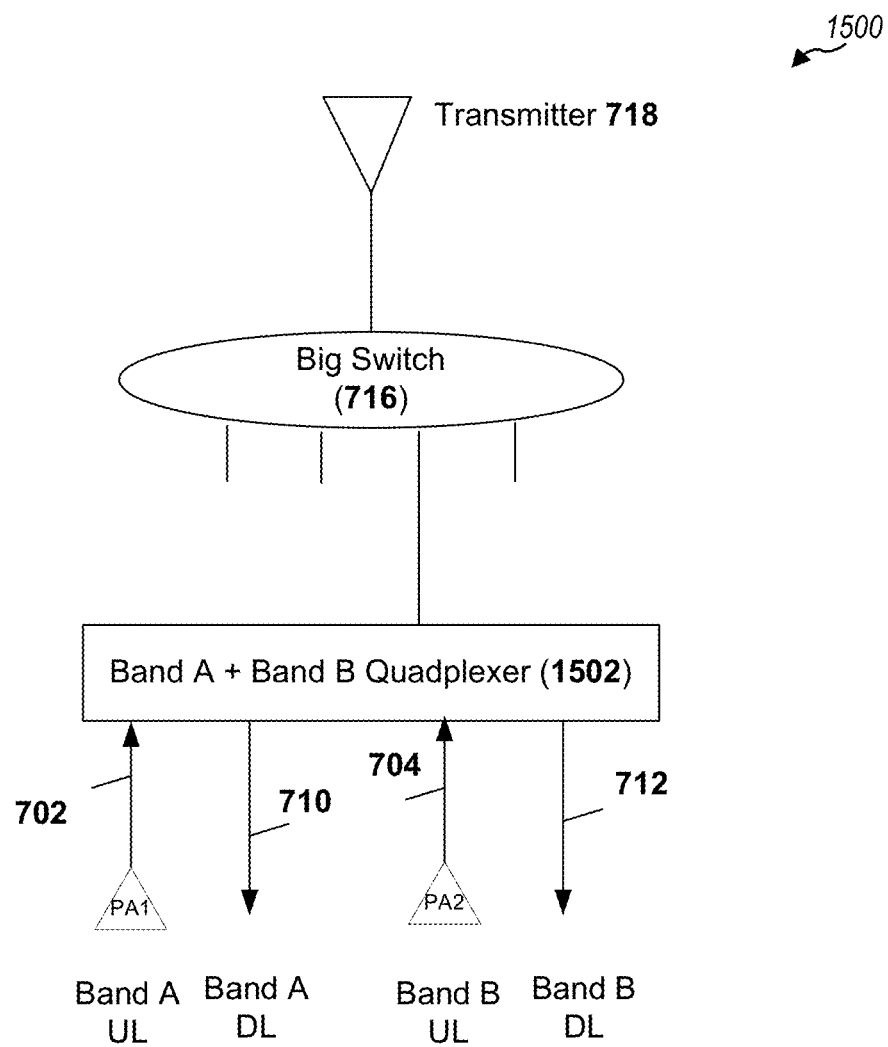
FIG. 15 is a block diagram representation of a dual band user equipment radio frequency front end with a quadplexer.

FIG. 15 is a block diagram representation of a wireless communication device 1500. In the device 1500, a quadplexer 1502 is provided for the isolation of uplink signals 702, 704 and the downlink signals 710 and 712. One of skill in the art will appreciate that a typical quadplexer (e.g., quadplexer 1502) may exhibit an insertion loss that is 1.2 to 1.5 dB greater than the insertion loss of a typical duplexer.

Figure 16:
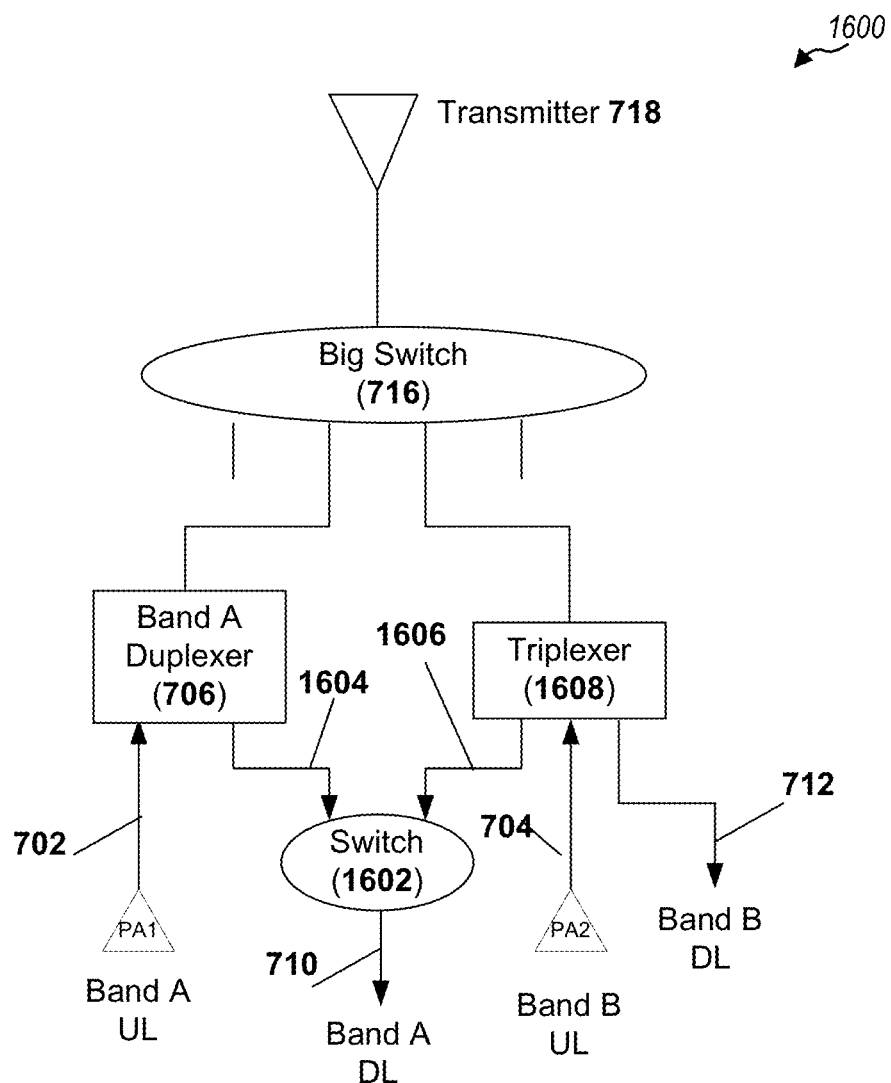
FIG. 16 is a block diagram representation of a dual band user equipment radio frequency front end with a triplexer and a bypass switch.

FIG. 16 is a block diagram representation of a wireless communication device 1600 where, compared to the device 1500, the quadplexer 1502 is replaced with a duplexer 706, a triplexer 1608 and a bypass switch 1602. During single band operation of the device 1600, the switch 1602 is operated to provide the output signal 1604 of the Band A duplexer 706 as the downlink signal 710. During the multi-band operation of the device 1600, the bypass switch 1602 is operated to provide the output signal 1606 of the triplexer 1608 as the downlink signal 710 (corresponding to the Band A downlink). Comparing the single-band operation of device 1600 with that of the device 1500, it will be appreciated that the insertion loss experienced by the downlink signal for Band A in the device 1600 may be typically less than by about 1 dB, because insertion loss through the quadplexer 1502 is avoided and substituted by insertion loss through the duplexer 706 and the bypass switch 1602.

Figure 17:
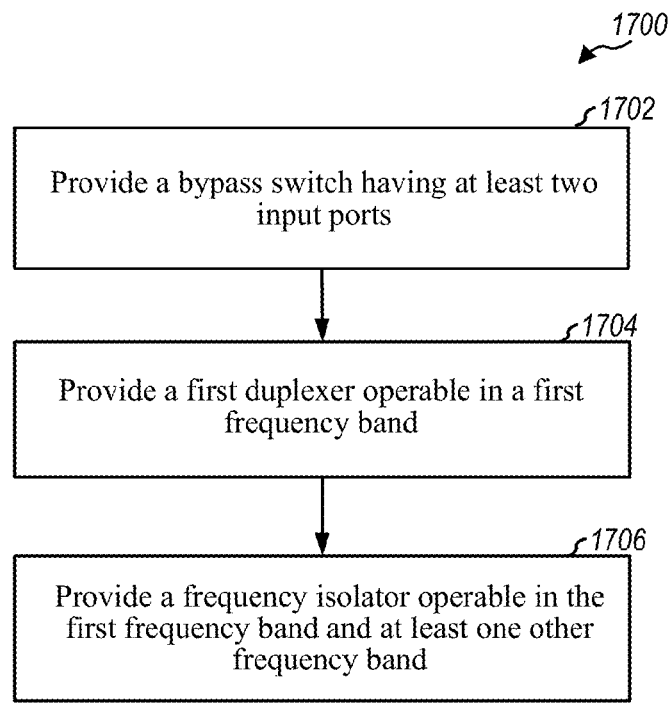
FIG. 17 is flow chart representation of a method of processing uplink signals in wireless communication system.

FIG. 17 is a flow chart representation of a method 1700 of processing a downlink signal in a multi-band transmission wireless device. At block 1702, a bypass switch having at least two input ports is provided. At block 1704, a first duplexer operable in a first frequency band is provided. At block 1706, a frequency isolator operable in the first frequency band and at least one other frequency band is provided. The bypass switch is configured to output a first downlink signal from the first duplexer, when operating in the first frequency band, and a second downlink signal from the frequency isolator, when operating in a multi-band mode. In some designs, e.g., the frequency isolator is a second duplexer. In some designs, e.g., the frequency isolator is a triplexer.

Figure 18:
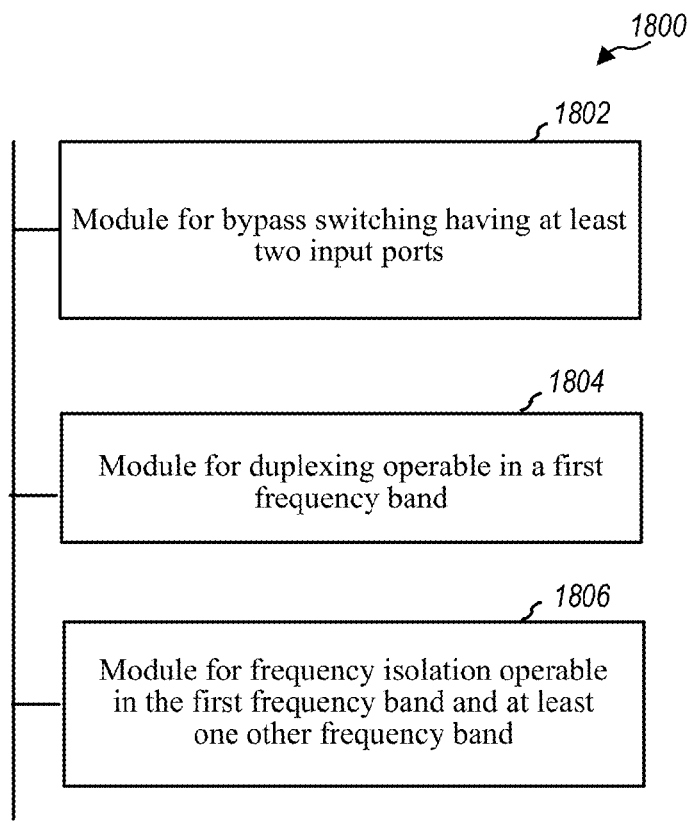
FIG. 18 is a block diagram representation of a portion of a wireless communication apparatus.

FIG. 18 is a block diagram representation 1800 of a portion of a wireless communication device. The module 1802 is for a bypass switch having at least two input ports. The module 1804 is for duplexing operations in a first frequency band. The module 1806 is for frequency isolation operable in the first frequency band and at least one other frequency band. The module 1802 is configured to output a first downlink signal from the module 1804, when operating in the first frequency band, and a second downlink signal from the module for frequency isolation, when operating in a multi-band mode.

It will be appreciated that several architectures and techniques for processing uplink and downlink signals in a wireless communication device that is capable of simultaneous multi-band communication are disclosed. In some disclosed designs, an uplink signal in a frequency band of interest is protected from other uplink/downlink signals using a bypass switch. By using bypass switches and duplexers as needed, in one aspect, the uplink and/or downlink signals are processed through the radio frequency front end of a wireless communication device without having to use a triplexer or a quadplexer for signal isolation. In one aspect, insertion loss savings of between 0.8 to 1.5 dB may be achieved in the uplink and/or downlink direction. It will be appreciated that such a reduction in the insertion loss may help improve the range of a wireless cellular network.

Those of skill would further appreciate that the various illustrative logical blocks, modules, circuits, and algorithm steps described in connection with the disclosure herein may be implemented as electronic hardware, computer software/firmware, or combinations of both. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication in a multiple frequency band user equipment configured to operate in a single frequency band mode and a multiple frequency band mode, comprising:
    operating the multiple frequency band user equipment in the single frequency band mode with a first band or a multiple frequency band mode with the first band and a second band;
    routing uplink signals and downlink signals of the first band through a first duplexer and a bypass device when operating in the single frequency band mode and routing uplink signals and downlink signals of the first band and the second band through the first duplexer and a second duplexer, respectively, when operating in the multiple frequency band mode;
    bypassing a multiplexer through a bypass device while routing the uplink signals of the first band when operating in the single frequency band mode, and routing the uplink signals of the first band and the uplink signals of the second band through the multiplexer when operating in the multiple frequency band mode; and
    outputting, via the bypass device, a first downlink signal of the downlink signals of the first band, which bypasses the multiplexer, through the first duplexer when operating in the single frequency band mode and outputting, via the bypass device, a second downlink signal of the downlink signals of the first band through the first duplexer when operating in the multiple frequency band mode.

2. The method of claim 1, further comprising reducing an insertion loss value when the uplink signals bypass the multiplexer.

3. The method of claim 1, in which the multiplexer is one of a triplexer and quadplexer.

4. An apparatus for wireless communication in a multiple frequency band user equipment configured to operate in a single frequency band mode and a multiple frequency band mode, comprising:
    a memory; and
    at least one processor coupled to the memory, the at least one processor being configured:
        to operate the multiple frequency band user equipment in the single frequency band mode with a first band or a multiple frequency band mode with the first band and a second band;
        to route uplink signals and downlink signals of the first band through a first duplexer and a bypass device when operating in the single frequency band mode and routing uplink signals and downlink signals of the first band and the second band through the first duplexer and a second duplexer, respectively, when operating in the multiple frequency band mode;

to bypass a multiplexer through a bypass device while routing the uplink signals of the first band when operating in the single frequency band mode, and routing the uplink signals of the first band and the uplink signals of the second band through the multiplexer when operating in the multiple frequency band mode; and to output, via the bypass device, a first downlink signal of the downlink signals of the first band, which bypasses the multiplexer, through the first duplexer when operating in the single frequency band mode and to output, via the bypass device, a second downlink signal of the downlink signals of the first band through the first duplexer when operating in the multiple frequency band mode.

5. The apparatus of claim 4, in which the processor is further configured to reduce an insertion loss value when the uplink signals bypass the multiplexer.

6. The apparatus of claim 4, in which the multiplexer is one of a triplexer and quadplexer.

7. An apparatus for wireless communication in a multiple frequency band user equipment configured to operate in a single frequency band mode and a multiple frequency band mode, comprising:

means for operating the multiple frequency band user equipment in the single frequency band mode with a first band or a multiple frequency band mode with the first band and a second band;

means for routing uplink signals and downlink signals of the first band through a first duplexer and a bypass device when operating in the single frequency band mode and routing uplink signals and downlink signals of the first band and the second band through the first duplexer and a second duplexer, respectively, when operating in the multiple frequency band mode;

means for bypassing a multiplexer through a bypass device while routing the uplink signals of the first band when operating in the single frequency band mode, and routing the uplink signals of the first band and the uplink signals of the second band through the multiplexer when operating in the multiple frequency band mode; and means for outputting, via the bypass device, a first downlink signal of the downlink signals of the first band, which bypasses the multiplexer, through the first duplexer when operating in the single frequency band mode and outputting, via the bypass device, a second downlink signal of the downlink signals of the first band through the first duplexer when operating in the multiple frequency band mode.

8. The apparatus of claim 7, further comprising means for reducing an insertion loss value when the uplink signals bypass the multiplexer.

9. The apparatus of claim 7, in which the multiplexer is one of a triplexer and quadplexer.

10. A computer program product for wireless communication in a multiple frequency band user equipment configured to operate in a single frequency band mode and a multiple frequency band mode, comprising:

a non-transitory computer-readable medium having non-transitory program code recorded thereon, the program code comprising:

program code to operate the multiple frequency band user equipment in the single frequency band mode with a first band or a multiple frequency band mode with the first band and a second band;

program code to route uplink signals and downlink signals of the first band through a first duplexer and a bypass device when operating in the single frequency band mode and routing uplink signals and downlink signals of the first band and the second band through the first duplexer and a second duplexer, respectively, when operating in the multiple frequency band mode;

program code to bypass a multiplexer through a bypass device while routing uplink signals of the first band when operating in the single frequency band mode, and routing the uplink signals of the first band and the uplink signals of the second band through the multiplexer when operating in the multiple frequency band mode; and program code to output, via the bypass device, a first downlink signal of the downlink signals of the first band, which bypasses the multiplexer, through the first duplexer when operating in the single frequency band mode and to output, via the bypass device, a second downlink signal of the downlink signals of the first band through the first duplexer when operating in the multiple frequency band mode.

11. The computer program product of claim 10, in which the multiplexer is one of a triplexer and quadplexer.

12. An apparatus capable of operating in a single carrier mode and in a multicarrier mode, comprising:

a first uplink signal path and a first downlink signal path for a signal of a first frequency band, the first uplink signal path and the first downlink signal path being passed through a first duplexer when operating in the single carrier mode and in the multicarrier mode;

a second uplink signal path and a second downlink signal path for a signal of a second frequency band, the second uplink signal path and the second downlink signal path being passed through a second duplexer when operating in the multicarrier mode;

a diplexer operable to multiplex the first and second uplink signal paths;

an antenna switch coupled to the diplexer; and a bypass switch coupled to the diplexer, the antenna switch, and the first uplink signal path, the bypass switch operable to couple the first uplink signal path to the antenna switch when in single carrier mode, and being operable to couple the first uplink signal path to the diplexer when in multicarrier mode.

13. An apparatus capable of operating in a single carrier mode and in a multicarrier mode, comprising:

a first uplink (UL) signal path for a signal of a first frequency band;

a second UL signal path for a signal of a second frequency band;

a composite downlink (DL) signal path including a first DL signal path of the first frequency band and a second DL signal path of the second frequency band;

a first duplexer coupled to the first UL signal path and the composite DL signal path, the first UL signal path and the composite DL signal path passing through the first duplexer when operating in the single carrier mode and in the multicarrier mode;

a second duplexer coupled to the second UL signal path and the composite DL signal path, the second UL signal path and the composite DL signal path passing through the second duplexer when operating in the multicarrier mode;

an antenna switch coupled to the first and second duplexers; and a bypass switch coupled to the first and second duplexers, and the composite DL signal path, the bypass switch operable to couple the composite DL signal path to the first duplexer when in single carrier mode, and being operable to couple the composite DL signal path to the second duplexer when in multicarrier mode.

14. An apparatus capable of operating in a single carrier mode and in a multicarrier mode, comprising:
   a first uplink (UL) signal path for a signal of a first frequency band;
   a second UL signal path for a signal of a second frequency band;
   a first downlink (DL) signal path of the first frequency band;
   a second DL signal path of the second frequency band;
   a first duplexer coupled to the first UL signal path and the first DL signal path, the first UL signal path and the first DL signal path passing through the first duplexer when operating in the single carrier mode and in the multicarrier mode;
   a second duplexer coupled to the second UL signal path and the second DL signal path, the second UL signal path and the second DL signal path passing through the second duplexer when operating in the single carrier mode and in the multicarrier mode;
   a triplexer coupled to and operable to multiplex the first DL signal path, the second UL signal path and the second DL signal path;
   an antenna switch coupled to the first duplexer and the triplexer; and
   a bypass switch coupled to the first duplexer and the triplexer, and the first DL signal path, the bypass switch operable to couple the first DL signal path to the first duplexer when in single carrier mode, and being operable to couple the first DL signal path to the triplexer when in multicarrier mode.

* * * * *